Harvey & Dixon,
Meat Mangler.
No. 108,021. Patented Oct. 4, 1870.
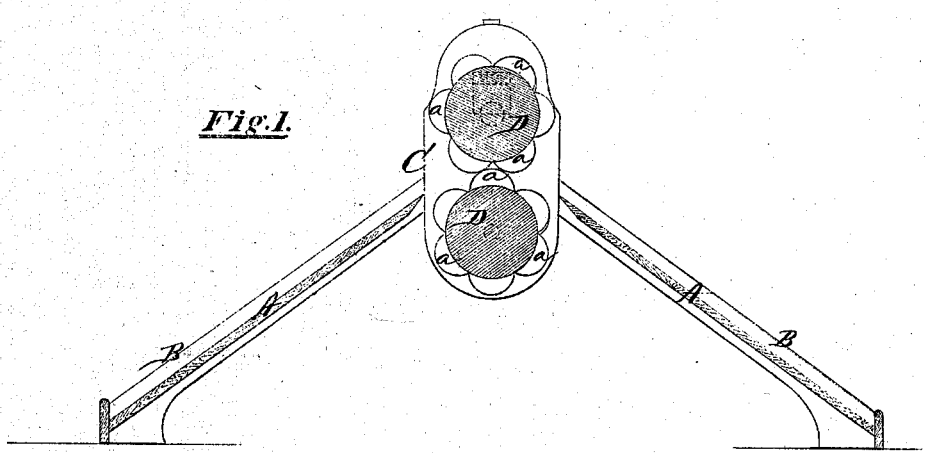
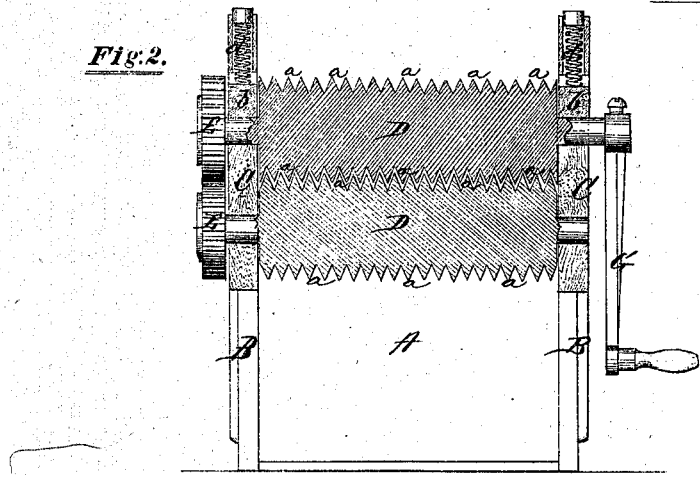
Witnesses:
Chas. Kenyon,
Edw'd P. Mast.
Inventor:
J. T. Harvey
W. Dixon,
Chipman Hosmer & Co.
Attys.

United States Patent Office.

JAMES T. HARVEY AND WILLIAM DIXON, OF MARYSVILLE, PENNSYLVANIA.

Letters Patent No. 108,021, dated October 4, 1870.

IMPROVEMENT IN MEAT-MANGLERS.

The Schedule referred to in these Letters Patent and making part of the same.

*To all whom it may concern:*

Be it known that we, JAMES T. HARVEY and WILLIAM DIXON, of Marysville, in the county of Westmoreland and State of Pennsylvania, have invented a new and valuable Improvement in Meat-Manglers; and we do hereby declare that the following is a full, clear, and exact description of the construction and operation of the same, reference being had to the annexed drawing making a part of this specification, and to the letters and figures of reference marked thereon.

Figure 1 of the drawing is a representation of our machine in longitudinal vertical section, and Figure 2 is a view of our machine in transverse vertical section.

The nature of our invention consists in the construction and arrangement of a meat-crusher or cutter for breaking the tough fibers in beef-steak, as will be hereinafter fully set forth.

In order to enable others skilled in the art to which our invention appertains to make and use the same, we will now proceed to describe its construction and operation.

A A represent two inclined planes for the meat to be received upon during the process of crushing or cutting.

Each of said inclined planes is inclosed in a frame, B, and the two frames are connected together at their upper ends by means of a block, C, on each side.

In the blocks C C the two rollers D D have their journal-bearings.

The surfaces of these rollers are provided with lance-shaped teeth *a a*, which mesh into each other, as shown.

The bearings for the lower roller are stationary, while the upper end is made yielding by means of the blocks or boxes *b b* and springs *d d*, as shown in fig. 2, so that either a thick or thin piece of meat may be passed between them.

Upon one journal of each roller on the same side is a cog-wheel, E, the two wheels gearing into each other, and upon the other journal of the other roller is a crank, G, by means of which motion is communicated to the rollers.

The meat in passing between the lance-toothed rollers gets its tough fibers crushed or cut, so as to render the meat tender, without the usual pounding or hacking.

Having thus fully described our invention,

What we claim as new, and desire to secure by Letters Patent, is—

The combination of the inclined planes A A and lance-toothed rollers D D, when constructed substantially as and for the purpose specified.

In testimony that we claim the above, we have hereunto subscribed our names in the presence of two witnesses.

JAMES T. HARVEY.
WILLIAM DIXON.

Witnesses:
JAS. C. BYERLY,
S. C. REMSBERG.